(12) United States Patent
Schultz

(10) Patent No.: US 7,162,426 B1
(45) Date of Patent: Jan. 9, 2007

(54) COMPUTER MOTHERBOARD ARCHITECTURE WITH INTEGRATED DSP FOR CONTINUOUS AND COMMAND AND CONTROL SPEECH PROCESSING

(75) Inventor: Robert G. Schultz, Berkley, MA (US)

(73) Assignee: Xybernaut Corporation, Chantilly, VA (US)

( * ) Notice: Subject to any disclaimer, the term of this patent is extended or adjusted under 35 U.S.C. 154(b) by 1078 days.

(21) Appl. No.: 09/677,569

(22) Filed: Oct. 2, 2000

(51) Int. Cl.
G10L 21/00 (2006.01)

(52) U.S. Cl. .................. 704/275; 704/270; 704/270.1; 704/272; 710/124; 712/22

(58) Field of Classification Search ................ 704/254, 704/233, 270, 272, 250, 275; 710/124; 370/442; 712/22
See application file for complete search history.

(56) References Cited

U.S. PATENT DOCUMENTS

| | | | |
|---|---|---|---|
| 5,353,376 A * | 10/1994 | Oh et al. ..................... | 704/233 |
| 5,640,490 A * | 6/1997 | Hansen et al. ............... | 704/254 |
| 5,794,068 A | 8/1998 | Asghar et al. | |
| 5,794,164 A * | 8/1998 | Beckert et al. ............ | 455/3.06 |
| 5,797,043 A * | 8/1998 | Lewis et al. ................. | 710/56 |
| 5,844,824 A | 12/1998 | Newman et al. | |
| 5,915,236 A | 6/1999 | Gould et al. | |
| 5,951,664 A * | 9/1999 | Lambrecht et al. ......... | 710/124 |
| 6,081,780 A * | 6/2000 | Lumelsky .................... | 704/260 |
| 6,085,314 A | 7/2000 | Asghar et al. | |
| 6,154,830 A | 11/2000 | Sugimura | |
| 6,170,049 B1 | 1/2001 | So | |
| 6,182,203 B1 * | 1/2001 | Simar et al. .................. | 712/22 |
| 6,192,340 B1 * | 2/2001 | Abecassis ................... | 704/270 |
| 6,230,255 B1 | 5/2001 | Ashghar et al. | |
| 6,233,557 B1 * | 5/2001 | Poppert ...................... | 704/250 |
| 6,275,806 B1 * | 8/2001 | Pertrushin ................... | 704/272 |
| 6,324,592 B1 * | 11/2001 | Hindman ....................... | 710/3 |
| 6,330,247 B1 * | 12/2001 | Chang et al. ............... | 370/442 |
| 6,415,253 B1 * | 7/2002 | Johnson ...................... | 704/210 |
| 6,421,235 B1 * | 7/2002 | Ditzik ......................... | 361/683 |

* cited by examiner

Primary Examiner—Richemond Dorvil
Assistant Examiner—Qi Han
(74) Attorney, Agent, or Firm—Christopher M. Tucker

(57) ABSTRACT

The invention is essentially a motherboard design for personal computers which uses DSP hardware in conjunction with a general or specific purpose CPU to process command and continuous speech. The DSP hardware serves as a bridge between the audio input of the sound card or integrated sound module and the microprocessor. The DSP chip itself can serve as a processor and embedded speech engine for processing command and control speech. It can also serve as a pre-processor for continuous speech, converting the digital bit stream representing the speech to phonemes for processing by the CPU and software-based speech engine and can facilitate digital mobile phone functions and text to speech conversion.

20 Claims, 4 Drawing Sheets

COMPUTER MOTHERBOARD ARCHITECTURE WITH INTEGRATED DSP FOR CONTINUOUS AND COMMAND AND CONTROL SPEECH PROCESSING

INVENTION

The invention is essentially directed to a novel computer motherboard architecture which integrates digital signal processing hardware into the board as the direct audio input interface to handle command and control as well as continuous speech processing.

BACKGROUND OF THE INVENTION

Speech recognition and voice activation have gained increasing popularity as software-based speech engines have become more powerful and microprocessor speeds have achieved 1 GHz. Originally conceived as tool for taking dictation and affording limited control of the operating system, speech recognition now and in the future will become increasingly pervasive in all types of applications. Speech is the most natural and efficient form of communication. It can be incorporated into all control commands and various applications such as web browsers and search engines. Speech can be used to automate many operations performed manually on a computer. Some modern computers are even designed to be controlled primarily by voice. Two examples of this are U.S. Pat. Nos. 5,305,244 and 5,844,824 which teach a voice activated wearable computer which allows users to operate the computer in a hands-free mode. The disclosure of the '244 patent states, "The computing apparatus includes a voice recognition module, in communication with a processor, for receiving audio commands from the user, for converting the received audio command into electrical signals, for recognizing the converted electrical signals and for sending the recognized signals to the processor for processing, the voice recognition module being supported by the user." The '824 patent further discloses, ". . . a body-worn, hands-free computer system, which does not rely upon a keyboard input or activation apparatus but rather has various activation means, all of which are hands free." One of these activation means being speech. Thus, the invention disclosed by these two patents teaches a computer hardware platform which permits control of the operating system and various applications using voice as the primary activation.

Most people can speak about five times faster than they can type and probably ten times faster than they can write. Thus, there are significant gains in efficiency to be achieved from a successful integration of speech recognition and processing into personal computers. The current method of processing speech in the environment of computers is primarily a software based method. The sound card is used as an audio input and contains an analog to digital (A/D) converter that takes the sounds/words picked up by a standard analog microphone and converts them to a digital bit stream to pass on to the microprocessor. Then software, which is stored in memory, is used in tandem with the CPU to process the signal representation of the voice, whether command or just text, and to execute the appropriate command or function. The leading software applications for this kind of interaction are IBM Corporation's ViaVoice® and Dragon Systems Corporation's Naturally Speaking®. These are both speech recognition programs with speech recognition software engines that utilize the CPU of the computer for all processing of speech. This task is very calculation intensive of the CPU and significantly ties up and limits the system resources. In desktop or laptop environments, running off of AC power, this merely causes a degradation of system performance. However, in mobile and wearable environments, where power is usually supplied by batteries, it also causes an excess consumption of power. There is a direct correlation between clock cycles performed by the CPU and power consumption. Additionally, in these mobile/wearable environments, where space is also limited, and little or no active cooling is employed, excess heat generation can cause degradation to memory, motherboard and other silicon-based electronic components and can also cause a degradation in CPU speed to accommodate the heat build up. Thus, an architecture which extends the usable battery life and reduces heat build up by the CPU while efficiently and effectively processing speech would be a significant advancement over the state-of-the-art.

Recently there has been recognition of the use of a digital signal processor (hereinafter DSP) chip for processing of natural speech. An example of this is customer service phone systems whereby callers can speak their input as well as key it in on the keypad integral to their telephones. The DSP is integrated into the phone tree system. When the system receives a signal representative of a spoken word, the DSP performs a matching against known signals representative of known words and effects an input of this data. These systems, however, are generally limited to numeric recognition and are not available in consumer oriented products.

A DSP is essentially a general purpose microprocessor which can be applied to various specific use applications. It includes special logic hardware for executing mathematical functions at speeds, power consumption levels, and efficiencies not usually associated with microprocessors. These chips can be programmed to perform various signal processing functions. There are many commercially available expansion cards for PC's which include DSPs, and generally a software application for programming them, to perform signal processing functions. Because of their hardware and architecture they are generally better suited to performing certain computationally intensive functions.

The design of the DSP is typically optimized specifically for mathematical algorithms such as correlation, convolutions, finite impulse response (FIR) filters, infinite impulse response (IIR) filters, Fast Fourier Transforms (FFT's), matrix computations, and inner products among other operations. Implementations of these mathematical algorithms generally comprise long sequences of systematic arithmetic/multiplicative operations. FFT's and filters are of particular relevance to the processing of speech.

A CPU is generally comprised of an execution unit, cache memory, a memory management unit, and a floating point unit as well as other logic. The task of a general purpose CPU is to execute code and perform operations on data in the computer memory, thus managing the computing platform. In general, the basic X86 or other type computer CPU is designed primarily to perform Boolean/management/data manipulation decision operations. The instructions executed by a general purpose CPU include basic mathematical functions. However, these functions are not well adapted to complex DSP-type mathematical operations. Thus, a general purpose CPU is required to execute a large number of instructions, relative to a DSP, to perform even basic DSP functions.

In the prior art there have been attempts, both in hardware and in software, at incorporating DSPs into the architecture of PCs to take advantage of the efficiencies associated with doing so. U.S. Pat. No. 5,794,068 (hereinafter designated as the '068 patent) teaches one example. In the '068 patent a general purpose CPU is disclosed which contains a general purpose CPU unit such as an X86 core, and also includes a DSP core. The CPU includes a DSP function decoder or preprocessor which examines sequences of instructions and determines if a DSP function is being performed. If the decoder determines that a DSP function is being executed, the function decoder converts the instruction sequences into a DSP macro and routes the macro to the DSP core. The DSP core is able to perform the DSP function in parallel with other operations performed by the general purpose CPU core. The design of this insures that it will be reverse compatible with existing software packages which will require DSP operations to be performed and with those that will not. However, because of the preprocessor, a extra step is introduced to the execution cycle. A disadvantage of the '068 patent is that a command must be decoded to check for DSP instructions prior to processing of the command. An additional disadvantage of the system of the '068 patent is that this architecture is not optimized for the processing of speech and does not teach the inclusion of a command and control speech engine residing in the DSP chip itself. Additionally, the DSP does not serve as the primary interface to all speech input signals originating from the audio input of the computer.

In another example, U.S. Pat. No. 5,915,236 (hereinafter the '236 patent), teaches a software approach to utilizing DSP to process speech. The '236 patent teaches a word recognition system that detects the computational resources available to it, such as speed, number of processors, presence of a DSP, and alters the instructions it executes in response to this detection to optimize the allocation of instructions. The system is primarily a speech recognition program, but the actual word recognition program can vary the computational intensity of its signal processing as a function of available computational resources. If the program detects both a CPU and a DSP processor, it can cause the DSP to determine when the program should interrupt the CPU. The program can also vary the rate at which it filters relatively low scoring words out of consideration during the recognition process as a function of the level of available resources. The disadvantage or problem with this system is that it is a software-based solution that is inherently limited by the architecture of the computer it is running on. That is to say, in the absence of a DSP, the system will accept less robust and accurate performance. Furthermore, the software and CPU are required to check the code for DSP instructions introducing an extra step into the process.

Thus, there exists a need for a speech processing architecture for personal computers, especially mobile, hand-held and wearable computers, which overcomes the above noted deficiencies.

SUMMARY OF THE INVENTION

It is therefore an object of this invention is to provide a novel motherboard devoid of the above noted disadvantages.

It is also an object of this invention to provide a novel motherboard architecture with integrated digital signal processing (herein after "DSP") capability.

It is another object of this invention to provide a hardware architecture which is optimized for the processing of speech.

It is yet another object of this invention to provide a motherboard architecture which reduces power consumption and clock cycles of the CPU when processing speech.

A further object of this invention is to provide a computing architecture which provides increases in accuracy and capability over existing software-based speech processing methods.

Still a further object of this invention is to provide a motherboard architecture for PC's, especially mobile, hand-held and wearable PC's, and other electronic devices, which reduces the number of cycles required by the CPU to process speech.

An additional object of this invention is to provide a speech processing design for mobile, hand-held, and wearable computers which reduces power consumption and heat generation during the processing of speech.

Yet another object of this invention is to provide an architecture which permits noise cancellation and subtraction while processing speech.

Still another object of this invention is to provide a DSP embedded speech engine which is capable of customization of the command and control speech vocabulary.

These and other objects of the disclosed invention are accomplished generally by a computer motherboard design which incorporates DSP hardware into the motherboard as an interface between the audio input and the microprocessor for the recognition and processing of speech commands.

BRIEF DESCRIPTION OF THE DRAWING(S)

DETAILED DESCRIPTION OF THE INVENTION AND PREFERRED EMBODIMENTS

Figure 1:
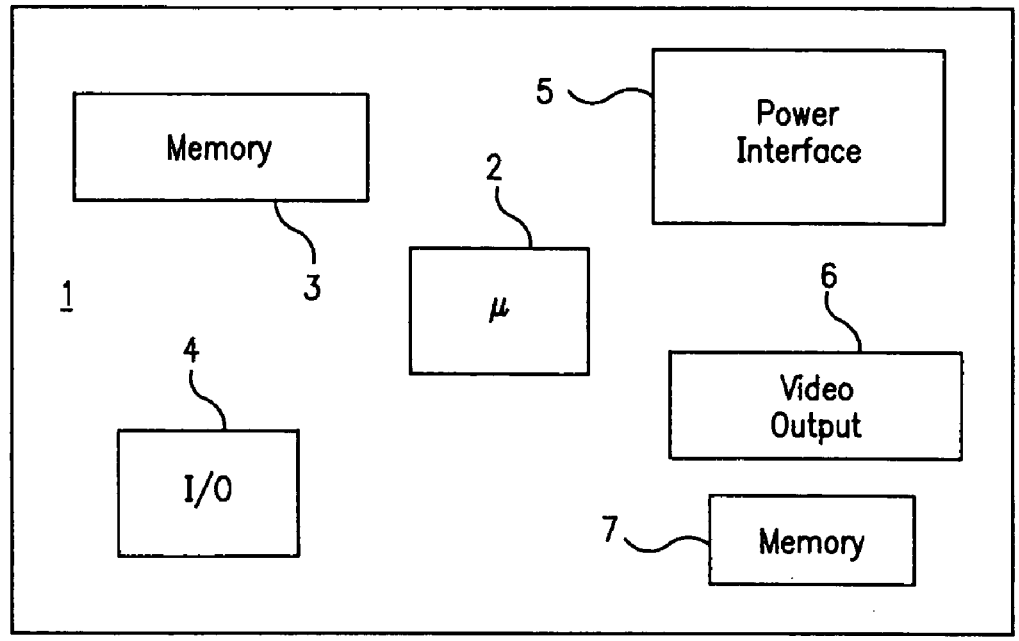
FIG. 1 illustrates a typical computer or computing device motherboard with typical system components.

For the purposes of this specification and claims, the term "computer motherboard" will include any motherboard that is used with a personal computer, a wearable computer, a portable computer, a laptop computer, a combination computing and communications device, or a palmtop computer. The invention is essentially a novel computer motherboard architecture which incorporates DSP hardware into the motherboard as an interface between the sound card, or like audio input device, and the microprocessor. This will solve several problems with existing speech processing architectures. The incorporation of DSP into the voice data input stream will add significant capability to current speech processing architecture and will minimize utilization of the microprocessor while processing speech. The problem with the current method of using the CPU and software-based engines such as ViaVoice® and Naturally Speaking® to process speech is that microprocessors are not suited to performing the vast number of Fast Fourier Transforms (herein after FFT's) required in speech processing. This causes extensive use of the processor which is draining on power, causes excessive heat build up, and prevents the processor from performing other tasks as quickly as otherwise possible. Microprocessors consume power which is measured in the order of magnitude of watts. By placing a DSP as the bridge between the A/D converter and the microprocessor, pre-processing of continuous and command speech can be done by the DSP, thus saving considerable power and allowing additional verification to enhance accuracy. The DSP chip, such as the TMS5000 series of DSP's manufactured by Texas Instruments Corporation, of Dallas, Tex., consumes only milli-watts of power, a several order of magnitude reduction over the CPU. Secondly, these chips are optimized for performing the kind of computational operations required for effective and efficient speech processing. Thus, increases in accuracy, speed, and capability will be realized as a result of this architecture. Additionally, the CPU will be free to perform other tasks related to software applications concurrently running on the computer, some of which can be used to enhance recognition accuracy and the interactive experience with the user. This has significant benefits for both wearable/portable computers as well as desktop and home computers. In the wearable/portable computing environment in particular, overall utility of the device is increased by an ability for robust speech processing. For the purposes of this disclosure, wearable computers are computers such as those disclosed in U.S. Pat. No. 5,844,824, assigned to Xybernaut Corporation of Fairfax, Va. and successfully commercialized under the trade name Mobile Assistant®. U.S. Pat. No. 5,844,824 discloses the use of communication means with the user supported computer. Also, any display may be used with the present system such as HMD, neck hung display, flat panel displays or any other suitable display. The disclosure of that patent is hereby incorporated by reference into the present disclosure. However, one of ordinary skill in the art will appreciate that wearable computers could also refer to computers manufactured by other entities or motherboard-based computer and electronic products which have not currently been manufactured. The incorporation of this technology will allow users to robustly and accurately utilize such devices using voice activation rather than or in addition to manual or pointing device activation. Also, because of the reduced power consumption by the DSP over the CPU, usable battery life of the device will be significantly extended. In the desktop environment, the benefits of more efficient speech processing and of freeing up of CPU clock cycles will also be realized.

Speech processing, in the context of a computer, can be broken into two basic categories: the first being command and control and the second being continuous speech. Command and control speech is words which are used to control the operating system or to navigate through a specific application. These words or phrases can be customized and linked to specific commands. Phrases such as "open window" or "scroll down" are examples of command and control speech. They are generally words chosen from a limited or sectionalized vocabulary set, where each word is tied to a specific command for the computer. Currently this is processed by the software-based speech engine and the CPU. However, the DSP is capable of serving as a speech engine for these command and control words or phrases. The speech engine itself will reside in embedded memory in the DSP chip, so that only the translated command will be sent to the CPU for execution. This will permit full interpreting and processing of the speech by the DSP without the CPU being utilized at all. The command word template of legal words can reside in memory on the DSP or it can alternatively be loaded into the DSP's memory from the host CPU based on context and application permitting a variety of different control command libraries depending upon the application being used. In this manner, the DSP will not require extensive memory because there would be only a limited command word set and context sensitive word templates can be actively loaded into the DSP's memory at any give time, or as the context changes. The command and control speech engine's memory requirements will be significantly reduced permitting efficient operation. Sixty four kilobytes of memory should be sufficient for a command and control library and is well within the memory capacity of current DSP's. As DSP chips become more robust with respect to their amount of memory, it may become practical and efficient to store more or all of the command and control word templates in the DSP's memory. The engine itself will be customizable so that the user can define the verbal command that effects the action. This will mitigate the problem of words which are similar in sound but effect different commands. For instance, if there are two commands which are phonetically similar, but which effect different results, a different voice command can be substituted to effect the same result or the appropriate contextual and environmental set of commands can dictate the proper response.

As to continuous speech processing, there are significant advantages in also using a DSP to assist the CPU in processing speech. When the CPU receives a digital sampled bit stream representing the spoken words from the CODEC's A/D converter, it has to convert them into phonemes or sounds which represent letter groupings or partial words, and then find the most probable word/sentence to represent the combination of sounds. This process of converting the bit stream to phonemes is very calculation intensive and the logic of a general purpose CPU is not optimized for this sort of process. The DSP chip can also serve as the front end processor for a software-based continuous speech engine. Because the dictionary of words is very large for a continuous speech engine and the DSP has a limited memory size, it will be more efficient to use the CPU and a software-based speech engine for the back-end processing. The DSP will take the bit stream input of speech and convert it to phonemes to pass off to the CPU for matching with the software-based speech engine. Phonemes are the basic indivisible units of sounds which make up words, such as a single syllable combination of letters. This pre-processing, normally performed by the CPU, will significantly reduce the total number of execution cycles required by the CPU to process a given number of words over the traditional CPU-only method of processing speech. It is the conversion of the bit stream to phonemes that requires massive amounts of FFT calculations. Thus, the power efficient DSP chip does much of the work the CPU does today, thereby reducing the CPU's use and leaving it free to process the software instructions required to convert the phonemes to actual words and sentences. This in turn will lead to benefits which manifest in the form of improved accuracy by the speech engine, faster system performance, reduced heat generation, and more efficient use of power. It may be necessary to develop a new software-based speech engine for processing continuous speech which allows the DSP to do the front end processing to best take advantage of this new architecture. Alternatively, the source code of commercially available continuous speech engines such as ViaVoice® and Naturally Speaking® can be modified to allow the DSP to do the front-end processing of speech which is currently done by the CPU.

Another advantage of the current invention is the ability to filter out and reduce ambient noise. The DSP chip is well suited to performing filtering and noise cancellation algorithms and will take the digital bit stream representing the speech, whether continuous or command and control, subtract away the noise, and then convert it to clean phonemes. If it is in command and control mode, it will extract the command and pass it off to the CPU. If in continuous mode, it will pass the phoneme off to the CPU for processing with the software-based speech engine. This ability to cancel out noise from the speech will allow users of computers based on this architecture to operate in high ambient noise environments with enhanced accuracy. For example, someone performing a maintenance operation in a turbine power plant, or on an aircraft assembly line where there are loud noises from tools and robots and riveting, will still be able to precisely control their computer using voice activation with little or no degradation in performance. This will have particular benefits to voice activated wearable computers and hand-held computers which are often utilized in these environments, permitting their users to maintain their hand(s) free while viewing and scrolling through information on the computer. Typically, these types of applications involve viewing interactive electronic technical manuals whereby a technician needs to be able to scroll and search through a computer-based expert system, parts list, or schematic while performing a maintenance or assembly operation. This type of operation is often performed on large or not easily moved pieces of equipment or articles of manufacture. As such, it will extend the utility of the technician's wearable computer if he can continue to operate it and navigate through his manual in high ambient noise environments such as are common to factories, power plants, assembly lines, etc.

This invention has other significant advantages for both traditional and wearable PC's. The DSP can facilitate and/or assist in the process of converting text to voice. This process is the reverse of speech recognition because the text words themselves need to be broken down into their composite phonemes for output to an audible speaker. Also, if the computer utilizing the on-board DSP is a wearable computer or hand-held device, and it is equipped with wireless communications capability, such as a wireless modem or other communications device, the DSP can handle mobile phone functions such as the digitization of the voice and of commands to facilitate features such as voice activated dialing, voice control, noise reduction, conversion of voice to signal, etc.

In a preferred embodiment, there will be software based controls for designating the mode in which the DSP will operate, that is to say command and control or continuous speech mode. This can be facilitated by one of several methods. In a one method a user, by activating software based controls will set the mode of the DSP either at system boot, or while the system is in the powered state. This mode may remain as a the default until changed. Alternatively, the system may power on in the command and control state, allowing a user to log in and control the operating system and select a specific application. However, once the application is invoked, if it is a application which requires continuous speech, such as a word processor, then the mode will automatically changed to continuous. It may be useful to have a mode interrupt command which will allow the user to switch modes in the middle of an application. For example if a user is done dictating text to his application and wants to now save a file or perform other tasks which require use of the pull down menus of the application his spoke words will then be interpreted as commands and not simply dictated speech. Additionally, there may be certain applications which can support a specific vocabulary of command and control words which can be loaded into the DSP's memory upon invocation of the application. For example if a web browser is invoked, all the commands required for navigating and performing standard browser functions will be loaded into the DSP's memory. Overall utility of the invention will be maximized by facilitating a variety of application specific commands in addition to the fundamental commands for controlling the operating system.

In another embodiment, the invention can be used to facilitate on-the-fly translation of natural language to a different language. For instance someone running a speech recognition translation program could speak into the computer in one language and have it translate it to another language for either text input or for displayed or audio output. The DSP would serve as the front-end processor for the CPU and the software and could perform preprocessing on foreign language. Additionally, special filters which are optimized for recovering a particular dialect could be loaded into the DSP to allow it to perform more accurate translation of the spoken input. Again, the hardware design of the DSP will allow it to perform this task more efficiently then the CPU.

In yet another embodiment, the invention can be used to integrate speech into other computing devices such as portable computing and communications devices. For example, personal digital assistants (PDAs), personal communications devices (ie. mobile phones capable of receiving and displaying Internet-type content), and even palm-top or hand-held computers can benefit from the present invention. By incorporating the teachings of this invention these devices can implement speech control in a manner that is robust and extremely power efficient. Since there portable computing and communication devices usually derive all their power from batteries, efficient use of power in running applications is of paramount importance. Furthermore, the processors on these type of devices are usually not as capable as those on wearable or desktop computers, thus, they would be even less able to perform DSP functions then state-of-the-art CPUs. The same increase in overall utility and convenience to the user will be realized as well. In a phone for instance, a user could use the DSP to facilitate voice activated dialing, either by speaking the number into the phone, or speaking a person's name which then is associated by signal matching by the DSP with a number stored in memory. In a PDA or palm-top computer the DSP could be used to facilitate control of specific applications such as an email program or web browser or it could be used to control the operating system itself. A user could simply speak the command to check email or open the browser rather then having to utilize a touch screen, mouse or other manual activation means.

In yet an additional embodiment, the teachings of the present invention could be used to facilitate voice control in a hand held, body-worn, otherwise portable, or non-portable gaming computer. The DSP on the motherboard could be used to facilitate voice control of the game machine, rather then requiring a user to push buttons to effect decisions. Alternatively, it could be used in tandem with manual controls to reduce the complexity of the manual controls by allowing certain decisions to made by voice. For instance, when playing a game in which the character (entity whose motion, position, and/or actions are controlled by the person playing the game) both moves and performs a manual actions such as firing a weapon or throwing a ball, the manual controls could be used for motion, while speech could be used to affect an action such as firing, or throwing, or selecting or reloading a weapon. This would add an extra dimension of realism to the game and free a user's hands to focus more on the basic commands. This is increasingly important with state-of-the-art video game systems such as those manufactured by Sony Corporation and those manufactured by Nintendo Corporation which have controllers allowing for ten or more different simultaneous commands. By offloading some of those commands to speech activation, the level of hand dexterity required will be reduced.

DETAILED DESCRIPTION OF THE DRAWINGS AND PREFERRED EMBODIMENT

Figure 2:
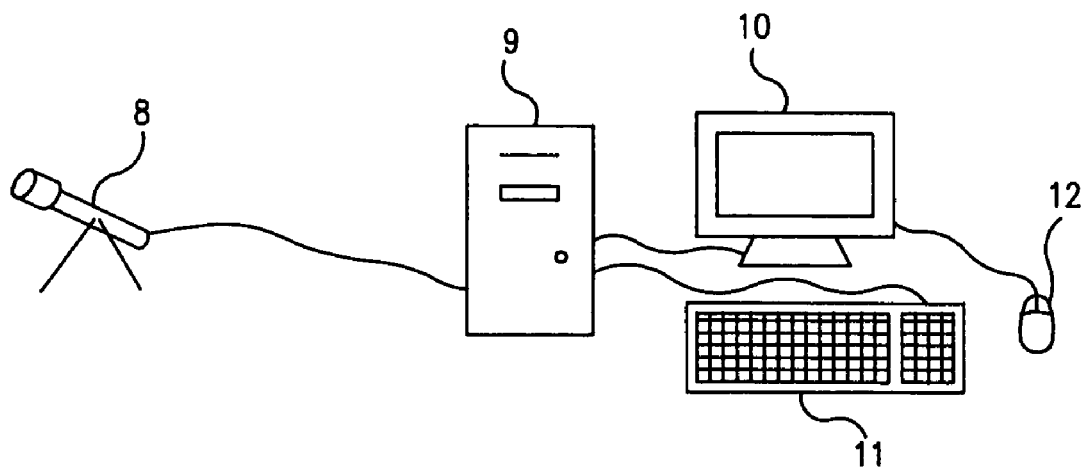
FIG. 2 illustrates a typical personal computer with a microphone serving as the source of audio input.

For an exemplary embodiment of the present invention refer to the figures. FIG. 1 illustrates a typical computer motherboard 1. The motherboard could be a personal computer mother board, a mobile computer motherboard, a computing and communications device motherboard, or other electronic computing device motherboard. Such a motherboard will typically possess fundamental system components such as a CPU, memory, a data bus, a power interface, an I/O interface, video output and audio output and optionally input. FIG. 2 illustrates a typical system level implementation of a personal computer operable to accept speech input. The computer system is comprised of a display 10, CPU box 9, keyboard 11, mouse 12, and microphone 8. The microphone 8 serves as the direct source of speech input into the computer for all applications.

Figure 3:
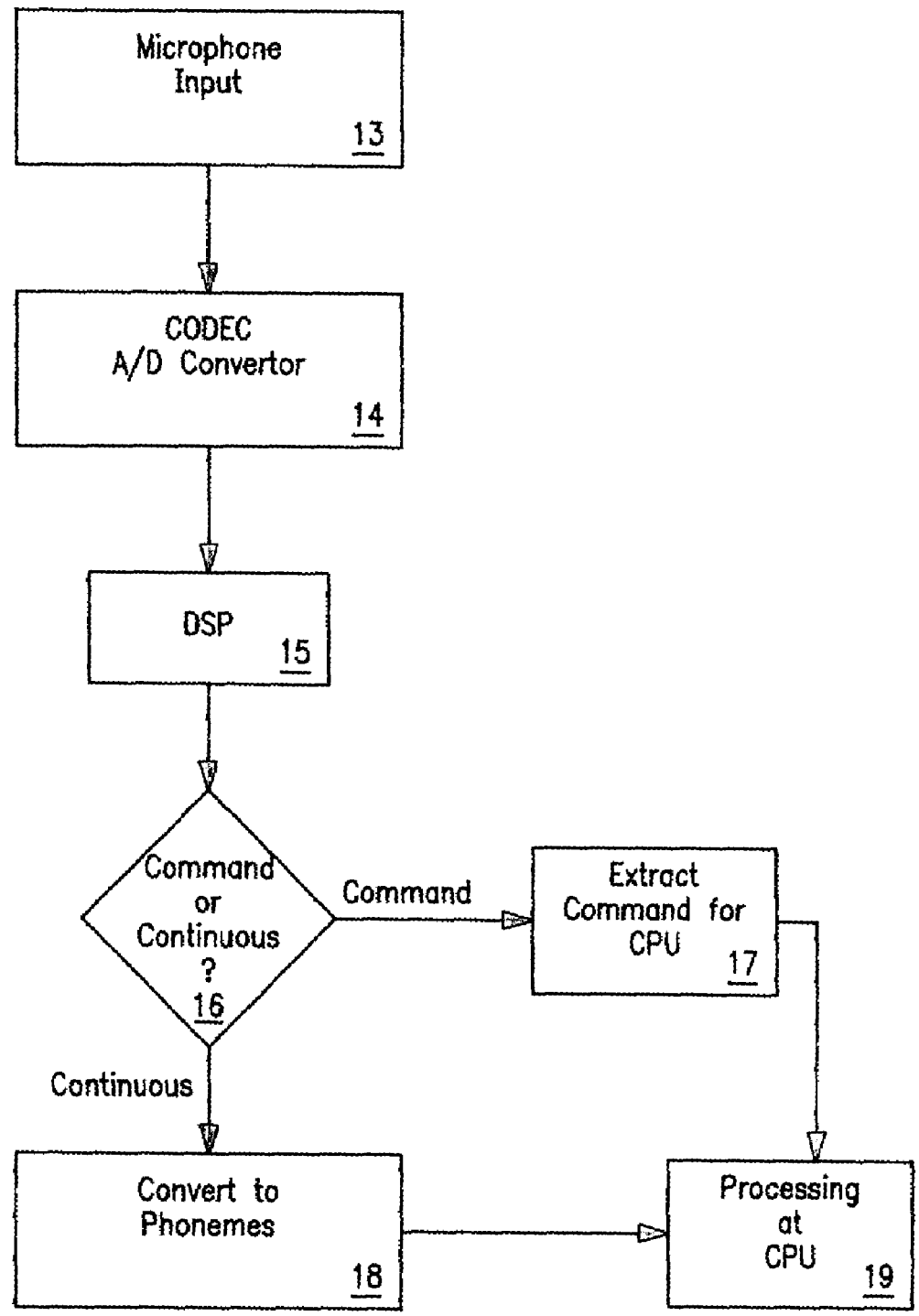
FIG. 3 illustrates in flow diagram form the process of the current invention with respect to speech input into the computing device.

FIG. 3 illustrates a functional flow diagram of speech input in the context of the present invention. Speech enters the system via microphone input 13 which converts the speech to an electrical signal. The data pathway then lead this signal to the CODEC 14 or like chip which performs and analog to digital (A/D) conversion on the signal. This digital signal then travels to the DSP 15 for processing. At this point the system enters a decision state 16 as to whether the DSP is operating in command and control (C&C) or continuous mode. If it is in C&C mode, the actual command is extracted at 17 and then sent to the CPU for processing 19. If however, the DSP 15 is operating in continuous speech mode, the DSP must convert it to phonemes at step 18 and then send these to the CPU 19 for processing in conjunction with a software-based speech engine.

Figure 4:
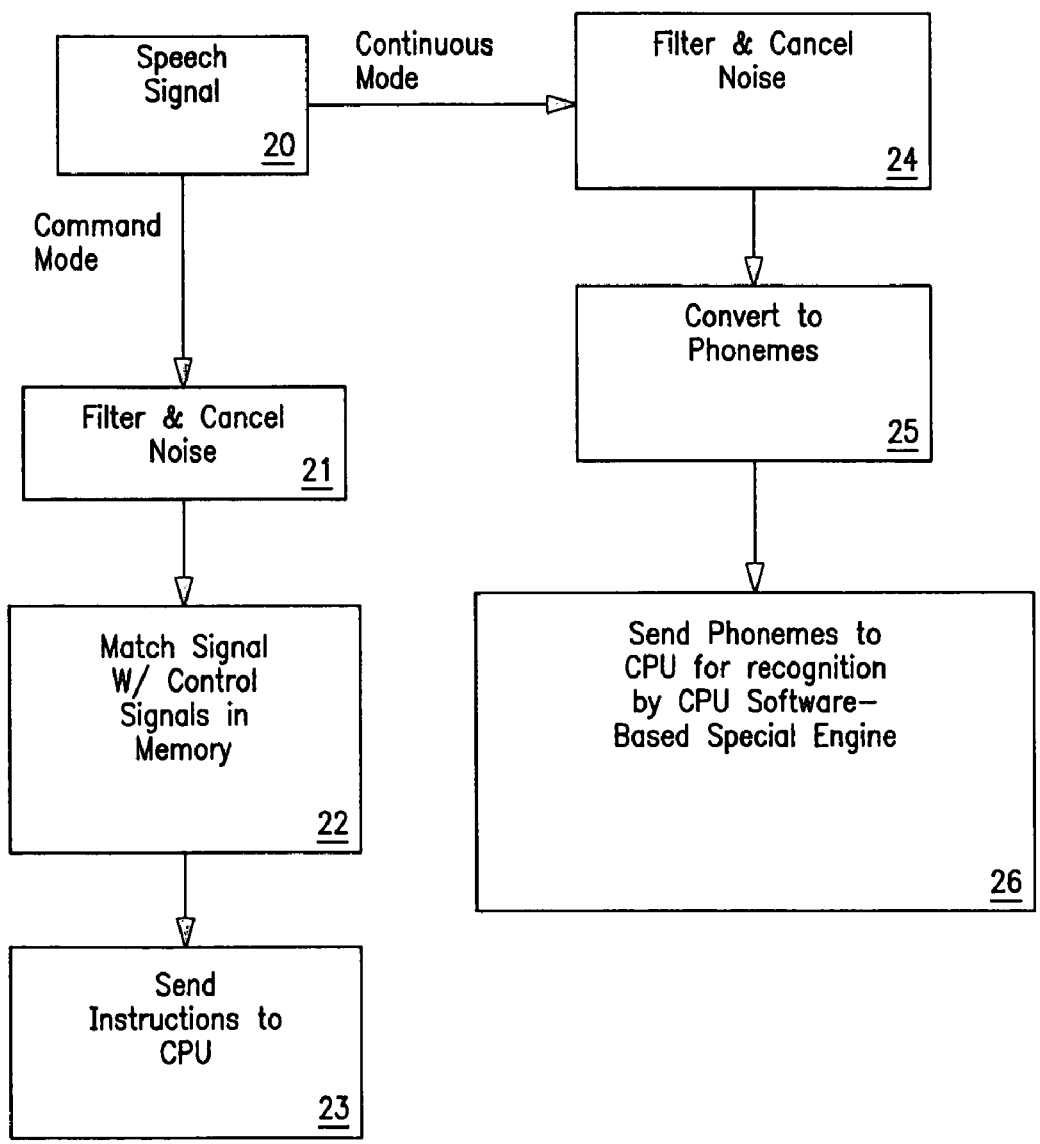
FIG. 4 illustrates the flow chart and decision tree for both continuous speech mode and command and control speech mode.

FIG. 4 illustrates a flow diagram of the process occurring in the DSP when a signal representative of speech is received. The speech signal 20 enters the DSP 15 which is set in either continuous or C&C mode. If in continuous mode, the signal is filtered and any noise is subtracted away at step 24. This process can be tailored to the specific physical environment or context of speech. Then at step 25 the signal is converted to phonemes and sent to the CPU for recognition by the CPU and software based speech engine at step 26. If the DSP is set in C&C mode then the signal also goes through a filtering and noise cancellation at step 21. This too can be optimized for specific types of ambient noise environment and certain types of control libraries. This clean signal representative of a command is then matched by the DSP with stored signals in a memory accessible by the DSP at step 22. Once the command has been extracted it is sent to the CPU at step 23.

Figure 5:
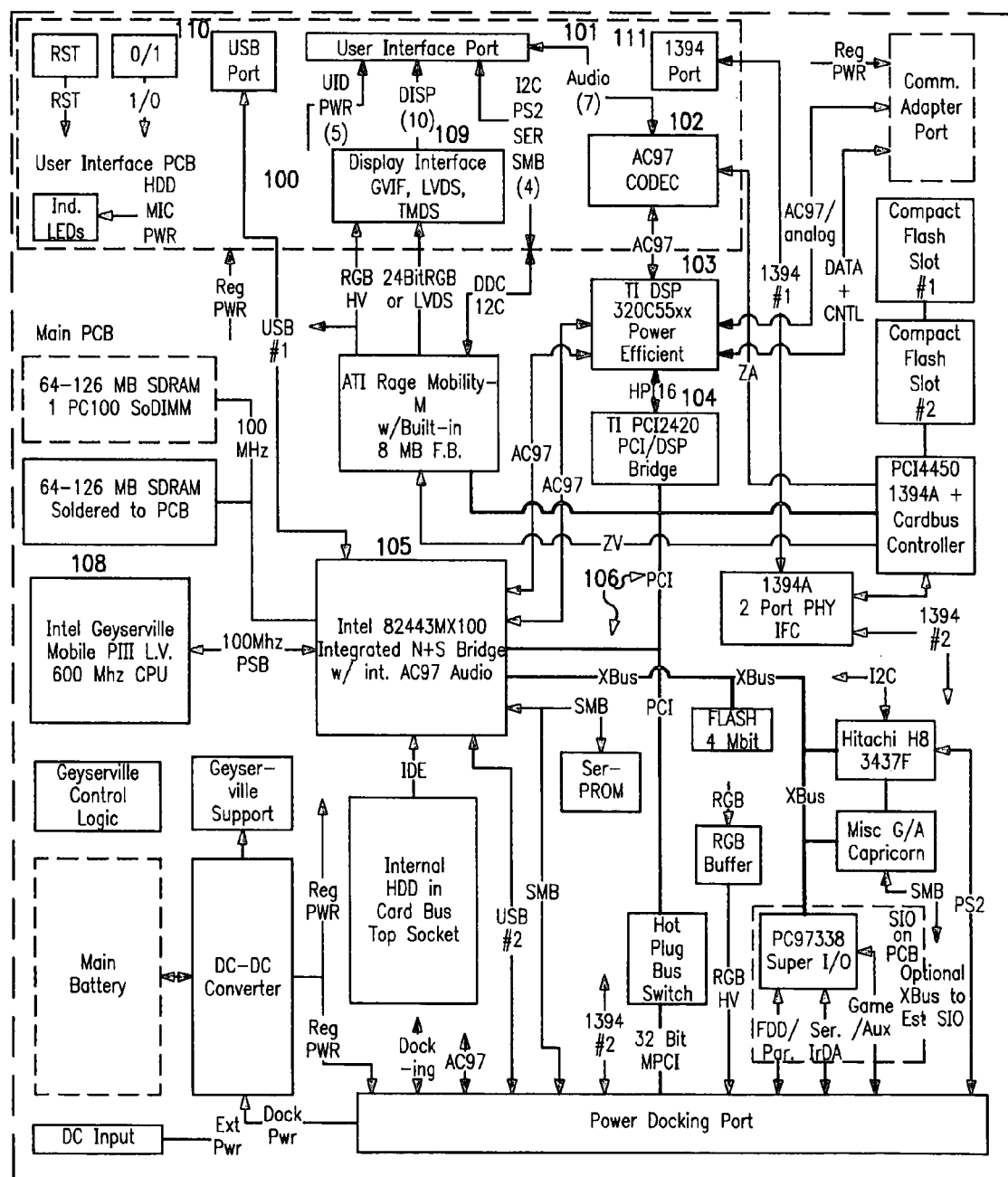
FIG. 5 illustrate an exemplary motherboard for a wearable computer with the DSP integrated into the circuit design and data pathway of the board.

FIG. 5 illustrates an exemplary embodiment of on-board DSP in the context of a mobile computer system board 200. Element 103 is a TMS5000 series DSP chip. It is integrated into the system board as a bridge between the audio input 101 and CODEC 102 and the CPU 108 and integrated Intel 82443MX100 N&S Bridge 105. Communication between the DSP 103 and the parallel PCI bus 106 is facilitated by a TI PCI2040 PCI to DSP Bridge chip 104, which enables the output signals of the DSP 103 to interface with the bus 106. The CPU 108 in this example is a 600 MHz mobile Pentium® chip manufactured by Intel Corporation; however, one of ordinary skill in the art will understand that any suitable computer CPU could be substituted without departing in spirit or scope from the present invention. In this example, a user interface PCB 100 is shown. This includes several typical input and output interfaces such as user interface port 101, USB port 110, 1394 port 111 and display port 109.

The typical data stream pathway for command and control or continuous speech processing would be as follows: Speech will enter through the analog audio input 101, from a standard analog microphone, which will be input through the user interface port 101. The analog audio signals will travel to the CODEC 102 where an analog to digital (A/D) converter changes it to a digital bit stream. This bit stream then travels to the DSP chip 103. The DSP 103 performs the necessary functions to "clean up" and process the speech into phonemes. If the computer is in command and control mode, the DSP 103 will use its internal speech engine to correlate the speech phonemes to an actual command. If it is in continuous mode it will merely convert the speech to phonemes. The next step is to pass the output, either a command to executed by the CPU 108 or a series of phonemes, through the data path so that it can be processed by the CPU 108. This is done by routing the output through a DSP-to-PCI bridge chip 104 which converts the output to a bitwise format which is compatible with the PCI bus 106. This output then routes through the Intel 82443MX100 105 for direct communication to the CPU 108. If it is command and control signal, then the command is executed by the CPU 108. The CPU 108 will be idle with respect to the voice processing up until this point. If it is a stream of phonemes, as is the case with continuous speech, then the CPU 108 will invoke the voice recognition software-based speech engine to process the phonemes and convert them to text for the purposes of whatever application the speech is associated with. One of ordinary skill in the art will understand that while this physical embodiment has been provided for illustrative purposes, that the invention itself can be applied to any computer motherboard regardless of configuration and that there may be a variety of permutations and variations which exist without departing in spirit or scope from the present invention, as long as the basic idea of the invention is represented, which is the use of a DSP in the audio input data path to serve as a continuous and command speech engine and/or as a front end processor for continuous speech, to process and facilitate menu selections or mobile phone commands and controls, and to assist in the conversion of text to speech.

The preferred and optimally preferred embodiments of the present invention that have been described herein illustrate the underlying principles of the invention, but it is to be understood that numerous modifications and ramifications may be made without departing from the spirit and scope of this invention.

I claim:

1. A computer motherboard architecture comprising:
   a computer motherboard possessing typical components including a CPU, a data bus, a power interface, and an audio input data pathway, said audio input data pathway connecting the audio input of the motherboard to the CPU;
   a DSP chip in the audio input data path, wherein the DSP chip is co-located with the CPU on the motherboard;
   a bridge interfacing between said DSP chip and the bus on the computer motherboard;

a memory in said DSP chip;

a command and control speech engine residing in said memory of said DSP chip;

wherein said DSP is enabled to operate in either command and control mode or continuous speech mode and said DSP serves as the preprocessor of all speech input prior to execution of instructions by the CPU to process the speech input and wherein said speech engine includes a vocabulary of speech terms enabled to be loaded into said memory which are associated with specific instructions or contextual environments, and further wherein said DSP is enabled to be dynamically set by a user in either a continuous speech mode or a command and control mode.

2. A computer motherboard architecture according to claim 1 wherein said computer motherboard is a desktop computer motherboard.

3. A computer motherboard architecture according to claim 1 wherein said computer motherboard is a video gaming system computer motherboard.

4. A computer motherboard architecture according to claim 1 wherein said audio input data pathway comprises a microphone input means for digitizing an audio input data pathway, and a DSP chip, bridge chip communicating with said bus.

5. A computer motherboard architecture according to claim 1 wherein said DSP chip is operable to convert said audio input into phonemes.

6. A computer motherboard architecture according to claim 1 wherein said computer motherboard is a computing and communications device computer motherboard.

7. A computer motherboard architecture of claim 1 wherein said computer motherboard is a component of a member selected from the group consisting of user supported computers, laptop computer, desktop computers, portable computers and mixtures thereof.

8. A computer motherboard architecture according to claim 1 wherein said vocabulary of speech terms is able to be defined by a user, either in a static or active mode.

9. A computer motherboard architecture according to claim 1 wherein said vocabulary of speech terms is refreshed by the CPU based upon the context of an application running on a host processor.

10. A computer motherboard architecture according to claim 1 wherein when said DSP is operating in command and control mode said DSP is operable to accommodate full interpreting and processing of said speech without said CPU being utilized.

11. A computer motherboard architecture according to claim 1 wherein said DSP chip is operable to perform menu selection including mobile phone audio functions comprising voice activated dialing, voice control, noise cancellation, and speech to signal conversion.

12. A computer motherboard architecture according to claim 1 wherein said DSP chip is enabled to perform noise cancellation functions.

13. A computer motherboard architecture according to claim 1 wherein said DSP chip is enabled to function in a command and control speech mode.

14. A computer motherboard architecture according to claim 1 wherein said DSP chip is enabled to fiction in a continuous speech mode.

15. A computer motherboard architecture according to claim 1 wherein said DSP chip is enabled to function in a mobile phone mode.

16. A computer motherboard architecture according to claim 1 wherein said DSP is enabled to unction in a language translation mode.

17. A computer motherboard architecture according to claim 1 wherein said computer motherboard is a user-supported computer motherboard.

18. A computer motherboard architecture according to claim 17 wherein said user-supported computer is a voice activated user-supported computer.

19. A computer motherboard architecture according to claim 1 wherein said computer motherboard is a portable computer motherboard.

20. A method of processing speech, the method comprising the steps of:

setting a computer in either command and control mode or continuous speech mode, inputting speech into an audio input device wherein said audio input device is electrically connected to said computer, converting said speech from an analog format to an audio digital signal, transmitting said digital signal to a digital signal processor, wherein said digital signal processor is co-located with a CPU on a motherboard of said computer and said digital signal processor is enabled to function as a preprocessor of all speech input, analyzing said digital signal with at least said digital signal processor and a speech engine residing in a memory of said digital signal processor on said motherboard and electrically connected to said digital signal processor, loading an appropriate vocabulary into said speech engine in said or of said digital signal processor, depending on the context of the operation being performed by a user;

transmitting said analyzed digital signal of a computer command to a processor in electrical connection to said digital signal processor and said computer, transmitting said analyzed digital signal of continuous speech to a processor in electrical connection to said digital signal processor and said computer, performing an operation or command representative of said analyzed digital signal by said processor.

* * * * *